June 18, 1940.     D. E. OLSHEVSKY     2,205,306
ELECTRICAL APPARATUS
Filed Jan. 26, 1938
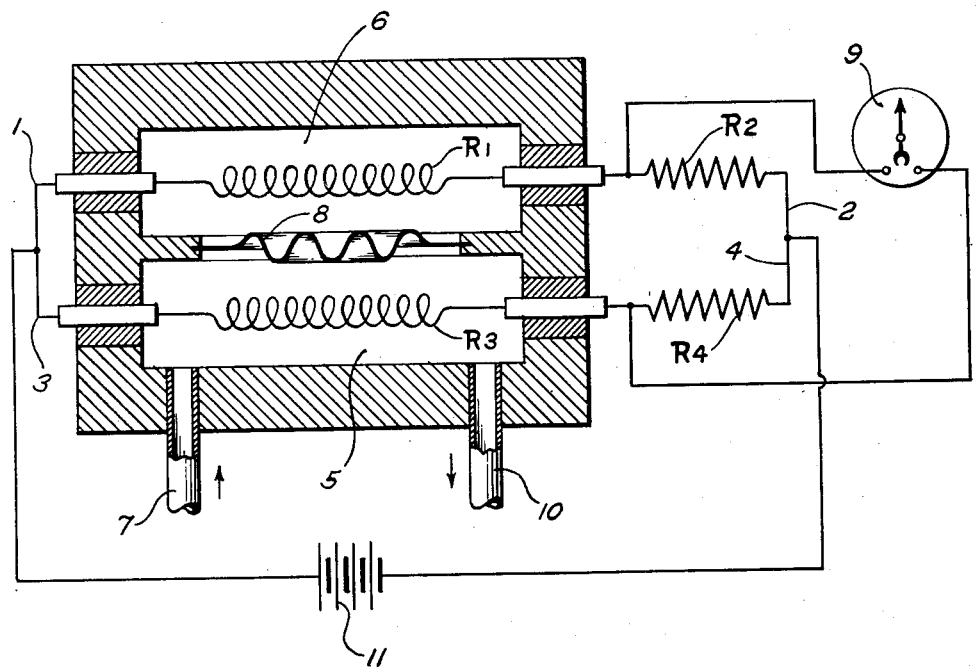
INVENTOR.
Dimitry E. Olshevsky
BY
ATTORNEY

UNITED STATES PATENT OFFICE 2,205,306

ELECTRICAL APPARATUS

Dimitry E. Olshevsky, East Orange, N. J., assignor to Eclipse Aviation Corporation, East Orange, N. J., a corporation of New Jersey Application January 26, 1938, Serial No. 187,071

2 Claims. (Cl. 171—229)

This invention relates to Wheatstone bridges and similar arrangements, using conductors made of a material possessing a negative thermal resistance coefficient as one or more of its branches, in combination with conductors having positive resistance coefficients.

The purpose of the invention is to provide an improvement in temperature compensation of the heating current in the bridge.

It can be seen that an ordinary bridge, when subjected to changes of temperature, changes the resistance of its branches in such a way as to cause fluctuations in the total current.

Deflections of the measuring galvanometer served by the bridge become, therefore, dependent on the temperature of the surrounding.

I have found that by proper selection of values for the resistances of the bridge elements in relation to their thermal coefficients of resistivity, either partial or practically complete compensation against total current variation in the bridge due to temperature of the surroundings may be obtained.

One feature of my invention is the incorporation, into the usual Wheatstone bridge, of resistances with negative thermal resistance coefficients in a way calculated to reduce or abolish variations of total bridge current due to variations in temperature of the surroundings, when in operation.

Another feature of my invention is the adoption of a definite relationship between the values of the resistances constituting the bridge, and their thermal resistance coefficients.

Such compensation is particularly valuable in continuous gas analysis apparatus, such as is described and claimed in Patent No. 1,646,247 granted to Herman Heinicke on October 18, 1927, the Heinicke apparatus being illustrated in the accompanying drawing by way of indicating the application of the invention thereto.

With reference to the accompanying drawing, forming part of this specification, representing the preferred embodiment, reference characters 1, 2, 3, 4, are the numbers of the conductors in a Wheatstone bridge arrangement; $R_1$, $R_2$, $R_3$, $R_4$—their respective resistance values.

The invention is illustrated as applied to a well known gas analyzing instrument such as that of Heinicke mentioned above. Reference characters 5 and 6 designate the test gas and the standard gas chambers respectively, 8 is the flexible diaphragm characteristic of the particular type of analyzer described, 9 is the measuring galvanometer, 7 and 10 are the gas inlet and outlet respectively, and 11 designates the battery.

My concept is to select the resistances and materials in such a way as to fulfill the following relations:

$$R_1 A_1 + R_2 A_2 = 0$$
$$R_3 A_3 + R_4 A_4 = 0$$

wherein $A_1$, $A_2$, $A_3$ and $A_4$ represent the respective thermal coefficients of resistivity.

In practice this is accomplished by using one or several negative temperature coefficient conductors and by making the value of some or all resistances inversely proportional to the absolute value of the resistance coefficients. For example, the resistance elements may be of the following materials, having the indicated resistance values and temperature coefficients:

| | Material | Approximate resistance value at operating temp. | Coefficient |
|---|---|---|---|
| Element R-1 | Platinum | 10 | +.0039 |
| Element R-2 | "Ohmax" | 490 | −.00008 |
| Element R-3 | Platinum | 10 | +.0039 |
| Element R-4 | "Ohmax" | 490 | −.00008 | the material "Ohmax" being an alloy of iron containing about 20% of chromium and 8.5% of aluminum, and commercially available as a standard product of at least one well known wire manufacturing company in the United States.

In operation, an increased air temperature of the surroundings will cause substantially the same increase in the operating temperatures of all conductors. This will result in a decrease of resistance of the conductors with negative thermal resistance coefficient $R_2$, $R_4$ and an increase of resistance of the conductors having positive resistance coefficients $R_1$, $R_3$.

When the resistances of the respective conductors are selected substantially in conformity with the relations stated above, it will be seen that the total bridge current, as delivered by the battery 11, will remain substantially constant. Furthermore, the resistance of each fundamental path of the bridge, i. e., $R_1 + R_2$ and $R_3 + R_4$, will also remain practically constant, and finally the voltage induced across the galvanometer will remain substantially constant (always assuming a continuing constancy in the characteristics of the gaseous mixtures, and further assuming that the galvanometer is of suitably high resistance, and that there are equal initial room temperature values for the resistances of conductor 1 and conductor 3).

What I claim is:

1. In a Wheatstone bridge, a plurality of resistance elements, having different reactions to temperature changes, but each being related to the others in such manner as to satisfy the following equations:

$$R_1A_1+R_2A_2=0$$
$$R_3A_3+R_4A_4=0$$

wherein characters $R_1$, $R_2$, $R_3$ and $R_4$ represent the resistance values of the elements constituting the four arms of the bridge, and wherein characters $A_1$, $A_2$, $A_3$ and $A_4$ represent the respective thermal coefficients, said resistance elements being further inter-related in such manner that the voltage across the mid-points of the bridge remains substantially constant.

2. In a Wheatstone bridge, a plurality of resistance elements, having different reactions to temperature changes, but each being related to the others in such manner as to satisfy the following equations:

$$R_1A_1+R_2A_2=0$$
$$R_3A_3+R_4A_4=0$$
$$R_1A_1-R_3A_3=0$$
$$R_2A_2-R_4A_4=0$$

wherein characters $R_1$ and $R_3$ represent the resistance values in the first two arms of the bridge, $R_2$ and $R_4$ represent the resistance values in the other two arms of the bridge, and $A_1$, $A_2$, $A_3$, and $A_4$ represent the respective thermal coefficients.

DIMITRY E. OLSHEVSKY.